(12) United States Patent
Chen et al.

(10) Patent No.: US 9,524,184 B2
(45) Date of Patent: Dec. 20, 2016

(54) OPEN STATION CANONICAL OPERATOR FOR DATA STREAM PROCESSING

(75) Inventors: Qiming Chen, Cupertino, CA (US); Meichun Hsu, Los Altos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 512 days.

(21) Appl. No.: 13/563,198

(22) Filed: Jul. 31, 2012

(65) Prior Publication Data

US 2014/0040915 A1 Feb. 6, 2014

(51) Int. Cl.
*G06F 9/46* (2006.01)
*G06F 9/48* (2006.01)
*G06F 9/38* (2006.01)

(52) U.S. Cl.
CPC ............ *G06F 9/46* (2013.01); *G06F 9/3851* (2013.01); *G06F 9/4843* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 7,010,538 B1 * | 3/2006 | Black | 707/636 |
| 7,129,860 B2 | 10/2006 | Alvarez et al. | |
| 7,966,340 B2 | 6/2011 | Friedman et al. | |
| 8,069,190 B2 | 11/2011 | McColl et al. | |
| 2006/0218123 A1 | 9/2006 | Chowdhuri et al. | |
| 2007/0025351 A1 | 2/2007 | Cohen | |
| 2007/0061305 A1 | 3/2007 | Azizi | |
| 2009/0094195 A1 | 4/2009 | Black | |
| 2009/0300615 A1 * | 12/2009 | Andrade et al. | 718/100 |
| 2011/0022572 A1 | 1/2011 | Arditi | |
| 2011/0041132 A1 | 2/2011 | Andrade et al. | |
| 2011/0154359 A1 * | 6/2011 | Toub et al. | 718/106 |
| 2011/0302207 A1 | 12/2011 | Asmundsson | |
| 2012/0005366 A1 | 1/2012 | Ma et al. | |
| 2012/0151292 A1 * | 6/2012 | Rowstron et al. | 714/748 |
| 2013/0173569 A1 | 7/2013 | Pearcy | |
| 2014/0040237 A1 | 2/2014 | Chen | |

OTHER PUBLICATIONS

Kun-Lung Wu, "Challenges and experience in prototyping a multi-modal stream analytic and monitoring application on System S", 2007, ISBN: 978-1-59593-649-3.*
Dionysios Logothetis, "Architectures for Stateful Data-intensive Analytics", 2011 University of California, San Diego.*
Edward Mazur, "Towards Scalable One-Pass Analytics Using MapReduce", 2011 IEEE University of Massachusetts, Amherst.*

(Continued)

*Primary Examiner* — Lewis A Bullock, Jr.
*Assistant Examiner* — Wynuel Aquino
(74) *Attorney, Agent, or Firm* — Trop, Pruner & Hu, P.C.

(57) ABSTRACT

Customizing functions performed by data flow operators when processing data streams. An open-executor(s) is provided as part of the data stream analytics platform, wherein such open-executor allows for both of: 1) customizing user plug-ins for the operators, to accommodate changes in user requirements; and 2) predefining templates that are based on specific meta-properties of various operators and that are common therebetween.

22 Claims, 9 Drawing Sheets

(56) References Cited

OTHER PUBLICATIONS

Duffy, et al. "Preliminary Evaluation of Map Reduce for High-Performance Climate Data Analysis", 28th IEEE Conference on Massive Data Storage, Apr. 16, 2012, 7 pages.

Espertech, Inc. "Esper-Complex Event Processing", Published online at [http://esper.codehaus.org/], dated Apr. 27, 2012, retrieved Jul. 30, 2012, 4 pages.

Yung. "Scalable Approach to Real-time Data Access", Teradata Magazine Online, retrieved Jul. 18, 2012. 4 pages.

Zeitler, E. "Scalable Parallelization of Expensive Continuous Queries Over Massive Data Streams", Acta Universitatis Upsaliensis, Digital Comprehensive Summaries of Uppsala Dissertations from the Faculty of Science and Technology 836, 2011, 152 pages.

* cited by examiner

OPEN STATION CANONICAL OPERATOR FOR DATA STREAM PROCESSING

CROSS-REFERENCE TO RELATED APPLICATIONS

This application is related to U.S. patent application Ser. No. 13/563,176 filed Jul. 31, 2012 and entitled "DATABASE RETRIEVAL IN ELASTIC STREAMING ANALYTICS PLATFORM". The entirety of the above-referenced applications is incorporated herein by reference.

BACKGROUND

As large-scale computations are becoming more and more affordable, distributed stream processing is receiving significant attention by various commercial enterprises. As such, real-time stream analytics has increasingly gained popularity, since enterprises need to capture and update business information just-in-time, analyze continuously generated "moving data" from sensors, mobile devices, social media of all types, and gain live business intelligence.

DETAILED DESCRIPTION

Figure 1:
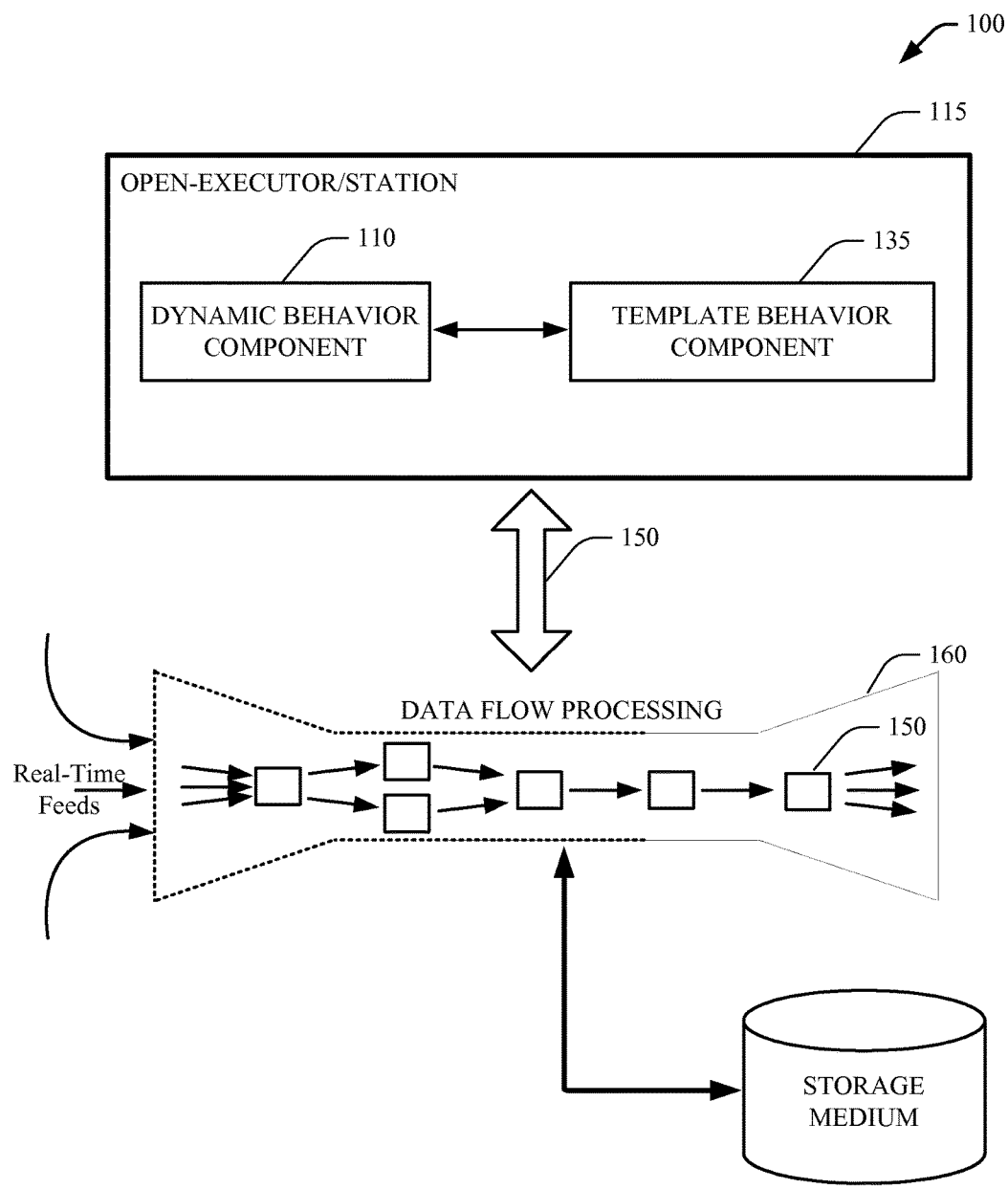
FIG. 1 illustrates a data stream processing analytics platform that can employ an open-executor according to a particular aspect of the subject disclosure.

A stream analytics process with continuous and graph-structured dataflow can include multiple operators with various pipes that connect such operators. In this regard, many dataflow operators can share common execution patterns in I/O, blocking characteristics, data grouping characteristics (which can be categorized for introducing unified system support), and the like. Such commonalities among dataflow operators can be considered as their "meta-properties"—and hence categorized for providing unified system support (e.g., operators that are placed in a same category can share such "meta-properties"/execution patterns). At the same time, operators for stream analysis can further be defined based on application logic, which if written manually can lead to fragile code/erroneous results, jeopardizing operational semantics and complicate user efforts/interactions.

The requirement for categorizing stream operators and their running patterns to provide automatic support, can further be employed to ensure that such operators are executed optimally and consistently. To this end, users' efforts for managing these properties manually—which are deemed tedious and error prone—can further be facilitated.

Moreover, additional requirements exist to elastically and accurately parallelize a stateful operator, which is history-sensitive, by relying on prior state and data processing results. Furthermore, a demand exists for manner of analyzing unbounded stream granularly to ensure sound semantics (e.g., aggregation).

For example, an infinite input data stream can be processed chunk by chunk, wherein each operator may punctuate data based on different chunking criteria. Such chunking criteria can be a predetermined time period (e.g., 1-minute or 1-hour time windows), which may require compliance with defined constraints (e.g. the frame of a downstream operator being same as, or some integral number of, the frame of its upstream operator). As such, granulizing dataflow analytics represents another kind of common behavior of stream operators, which further requires systematic support. Failure to properly address and abstract such issues in stream processing systems, and instead shifting them to user programs can result in fragile code, disappointing performance and incorrect results.

Various implementations of the subject disclosure standardize operational pattern of stream operators and support operator execution patterns automatically and systematically—via an open-executor in a stream analytics platform that includes continuous, real-time data-flow with graph-structured topology. Such open-executor can provide designated system support, while being receptive or "open" for accepting customized application logic to be plugged-in (hence the term open-executor). Furthermore, the open-executor can represent a container for a stream operator that is classified based on predetermined meta-properties.

In a related implementation, a station class hierarchy can be defined—wherein operations for each class is further facilitated based on its association with a respective open-executor and its related system utilities. For example, in an object oriented (OO) programming context, the open-executor of the subject disclosure can be coded by invoking certain abstract functions or processes, which are to be implemented by users based on their application logic.

In a related implementation the open executor of the subject disclosure, can facilitate developing streaming operations in different characteristic categories, and further provide for canonical mechanisms, to parallelize stateful and granule dataflow analytics. Accordingly, a data flow(s) can be handled chunk-wise and group-wise, for each vertex that represents a logical operator in its dataflow graph. Moreover, operation parallelization or launching multiple instances can occur with input data partition or grouping, wherein input data partitioning and data buffering remain consistent at each operation instance.

FIG. 1 illustrates a data stream processing analytics platform 100, which employs an open-executor 115 according to a particular implementation of the subject application. The open-executor 115 can represent an execution engine provided as part of the data stream analytics platform, such that the open-executor allows for both of: 1) accepting user plug-ins for the operators, to accommodate changes in user requirements (e.g., dynamically), wherein the plug-ins can change and are customizable based on changing logic of various applications; and 2) predefining templates that are based on specific meta-properties of the operators/data streams or are common therebetween.

In this regard, the open-executor 115 can include a dynamic behavior component 110 and a template behavior component 135. As such, the operators on a parallel and distributed dataflow infrastructure can be performed by both the infrastructure (associated with the template behavior component 135), and the user programs (associated with the dynamic behavior component 110). The template behavior of a stream operator can further depend on its meta-properties and running pattern.

In the data analytics platform 100 of FIG. 1, a dataflow element or tuple, may either be originated from a data-source or derived by a logical operator—wherein the operator is stationed and continuous. Such logical operator can have multiple instances (threads) over multiple machine nodes. Moreover, streams from the instances of operator A to the instances of operator B can be grouped (e.g. partitioned) in the same manner—and as described in detail below—wherein multiple logical operators, $B_1, B_2, \ldots, B_n$ can exist for receiving the output stream of A, yet each with a different data partition criterion.

In context of framework for processing parallel problems across substantially large data set, the open executor 115 of the subject disclosure can provide a substantially flexible and elastic approach (e.g., as compared to systems such as Hadoop™), when handling dynamically parallelized operations in a general graph structured dataflow topology. Moreover, the subject disclosure can support the template behavior, or operation patterns, automatically and systematically.

In a related implementation of the subject disclosure, the open-executor 115 can represent a container for a stream operator—wherein unlike applying an operator to data, stream processing can be characterized by flowing of data through a stationed operator. In this regard, stream operators with predetermined common meta-properties can be executed by the class of open-stations, which are specific to such operators.

As explained earlier, the open-station(s) 115 can be classified into a station hierarchy, wherein each class can be associated with an open-executor and its related system utilities. To this end, the station provides designated system support, while being receptive and open for accepting the application logic to be plugged-in and received by the dynamic behavior component 110.

In a related aspect, the subject disclosure can facilitate safe parallelization in data stream processing. Typically, a key to ensuring safe parallelization is to handle data flow group-wise-for each vertex representing a logical operator in the dataflow graph; wherein the operation parallelization with multiple instances occurs with input data partition (grouping), which further remains consistent with the data buffering at each operation instance. Such may ensure that in the presence of multiple execution instances of an operator, O, every stream tuple is processed once and only once by one of the execution instances of O. Furthermore, the historical data processing states of every group of the partitioned data are buffered with one and only one execution instance of O.

Likewise, the open-executor 115 of the subject disclosure facilitates performing granule semantics and managing dataflow in a "chunk-wise" manner, by punctuating and buffering data consistently. In general, the proposed canonical operation framework enables standardizing various operational patterns of stream operators, and support such patterns systematically and automatically. In this regard, the open-executor 115 of the subject disclosure facilitates such operation in real-time, continuous, elastic data-parallel and topological stream analytics. Accordingly, the analytics platform of the subject disclosure can be characterized by "real-time" and "continuous", with the capability of parallel and distributed computation on real-time and infinite streams of messages, events and signals. Moreover, the analytics platform of the subject disclosure can be characterized by "topological" features, to manage data-flows in complex graph-structured topology, (and not limited to the map-reduce scheme.) Furthermore, and unlike a statically configured Hadoop™ platform, the analytics platform with the open-executor 115 of the subject disclosure can scale-out over a grid of computers "elastically" for parallel computing.

Figure 2:
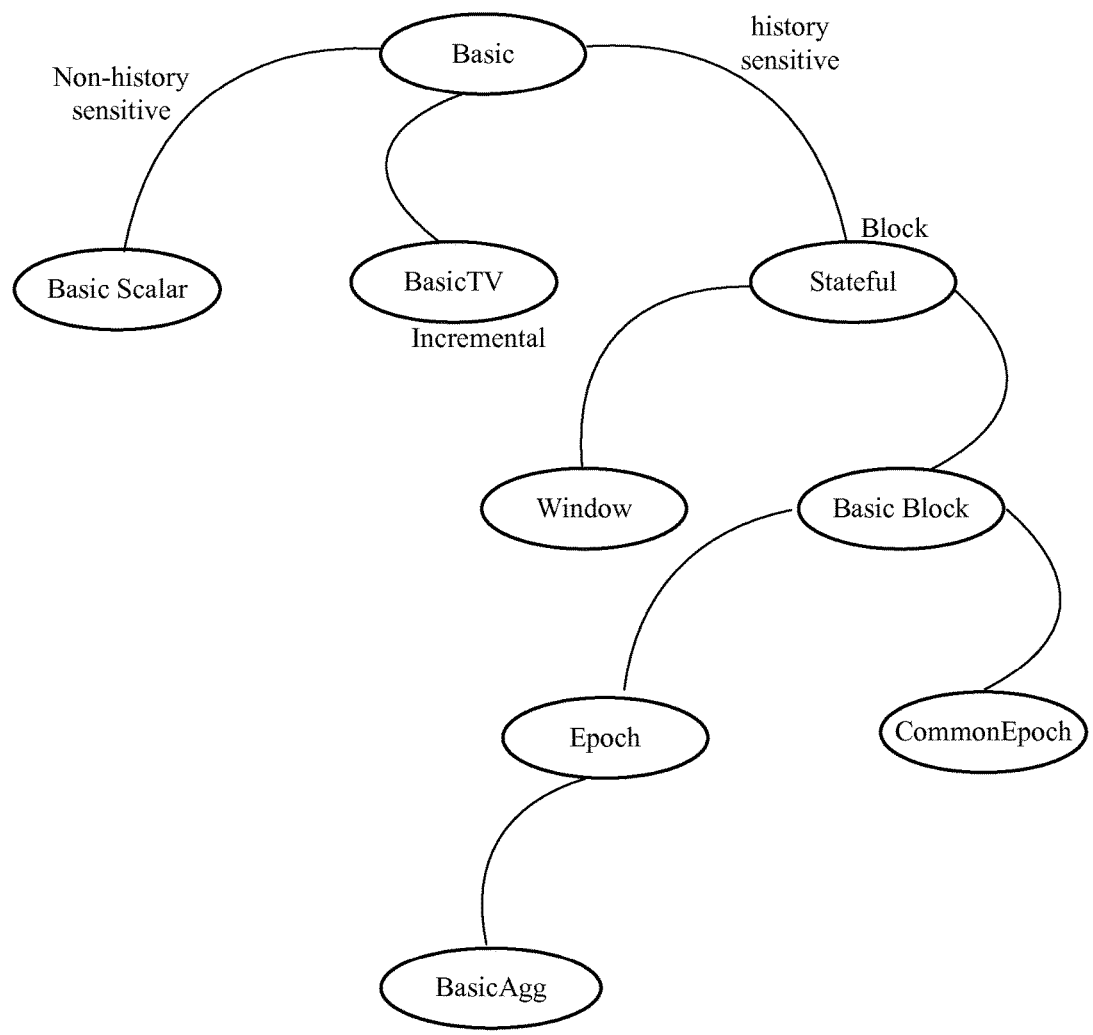
FIG. 2 illustrates an example of a hierarchy for a station in accordance with an aspect of the subject disclosure, wherein abstract functions can be inherited level by level.

FIG. 2 illustrates an example of a hierarchy 200 for an open-executor, or a station in accordance with an aspect of the subject disclosure, wherein abstract functions can be inherited level by level. In one example, a dataflow element (referred to as tuple) that is originated from a data-source or derived by a logical operator(s) A, can be sent to a receiving logical operator(s) B as data partitions (e.g. a hash-partition). Typically, for parallel computations, a dataset can be divided into data partitions, which can be operated on independently in parallel by separated machines. As such, if A and B both have multiple physical instances, the data sent from any instance of A to any instance of B can be partitioned in an identical manner.

In general, such can be deemed similar to reorganizing/redistributing of data (e.g., data shuffling) from a Map node to a Reduce node. Furthermore, there can be multiple logical operators, $B_1, B_2, \ldots, B_n$, for receiving the output stream of A, but each with different data partition criterion, referred to as inflow-grouping-attributes (e.g., as in SQL group by). In this regard, tuples that are grouped together and in the same partition can possess the same "inflow-group-keys".

As described in detail with the examples below, the tuples representing the traffic status of a express way (xway), direction (dir) and segment (seg), can be partitioned and grouped by, attributes <xway, dir, seg>—wherein tuples of each group have identical inflow-group-key derived from the values of xway, dir and seg. It is noted that an operation instance may receive multiple groups of data.

Moreover, for history-sensitive data-parallel computation, an operation instance may maintain a state computed from its input tuples, for example. Such state can be generally provided as a Key/Value (KV) store, wherein keys that are referred to as caching-group-keys, are Objects (e.g. String) extracted from the input tuples. Likewise, values can be deemed Objects that are derived from the past and present tuples, such as; numerical objects (e.g. sum, count); list objects (certain values derived from each tuple); and the like. The multiple instances of a logical operation can run in data-parallel, provided that the inflow-group-keys are employed as the caching group-keys. Accordingly, the KV store can be represented as Group-wise KV store (GKV).

In addition and as described in detail with respect to the following example, for continuous yet granular computation, the input data can be punctuated into chunks (e.g., "1-minute" time windows.) Moreover, the processing of the tuples associated with a chunk can be referred to as an epoch. In this regard, predetermined operations (e.g., aggregations) can be applied to the data chunk-wise by the end of each epoch, and other operations may be deemed tuple-wise. Essentially any operation may update the GKV, for chunk-wise aggregation, sliding window based calculation, and the like.

Such combination of group-wise and chunk-wise stream analytics provides a generalized abstraction for parallelizing and granulizing the continuous and incremental dataflow analytics. In a dataflow graph created accordingly, every vertex can be characterized by the inflow-grouping and the corresponding GKV caching, which remains consistent with the inflow-grouping.

In particular, a task can be contained in a station with task characteristics specified as the properties of that station. For example, a station can employ a Java object serving as the continuous and repeated executor of a task. In one implementation, mechanisms for capturing characteristics of tasks can include: 1) specializing/customizing station classes (sub-classing) by specific task characteristics, and 2) providing abstract methods to be implemented for each particular type station, such as a method for setting group-wise exec epoch. For example, specified in a station class, there can exist two kinds of predefined processes, namely: 1) the system defined methods and 2) the user defined methods. Accordingly, the system defined methods can include the open-executor that is open to plugging-in application logic, wherein abstract methods can be invoked or implemented by users according to the application logic. Similarly, the station class can include abstract methods that can be implemented by the user based on the application logic.

In a related example, a mechanism for introducing application context can include implementing predetermined abstract methods with the application logic. For instance, an open-executor or station/execution engine can be specified with the inflow-grouping-attributes and the granule criterion for group-wise and chunk-wise computation.

Accordingly, a GKV can be automatically generated; wherein GKV operations such as gkv.dump(key) (to list), gkv.clear( ), gkv.add( ), and the like, are system provided, for example.

Such operation can be applied tuple by tuple iteratively as supported by the system function execute( ) which can further invoke several abstract functions to be implemented by users based on the app logic. Examples can include:

groupKey(tuple)—that extracts the inflow-group-key from a tuple;
epochEnd(C, tuple)—that checks the end of epoch, very often upon receipt of the first tuple belonging to the next epoch;
processTuple(GKV, tuple)—that processes the current tuple; and
processChunk(GKV, key)—that processes the whole chunk.

In a related example, the EpochStation function can extend the BasicBlockStation, and be employed to support chunk-wise stream processing—wherein the framework provided functions that are hidden from user programs, can include:

```
public boolean nextChunk(Tuple, tuple) {// group specific ...}
    public void execute(Tuple  tuple,   BasicOutputCollector
collector) {
        boolean new_chunk = nextChunk(tuple);
        String grp = getGroupKey(tuple);
        GroupMeasures gm = null;
```

-continued

```
        if (new_chunk) {
            gm = getGKV( ).dump(grp);
        }
        updateState(getGKV( ), tuple, grp);
        if (new_chunk) { //emit last chunk
            processChunkByGroup(gm, collector);
        }
    }
```

The three functions of getGroupKey; updateState; processChunkByGroup; can further be implemented based on the application logic; whereas the other functions are deemed system defined for encapsulating the chunk-wise stream processing semantics.

Likewise, the user can implement the following functions:

```
BasicStation
    public abstract void execute (Tuple tuple,
BasicOutputCollector collector);
    public abstract Fields outputFields ( );
StatefulStation
    public abstract void updateState(GkvMap gKV, Tuple tuple,
String key);
    public abstract String getGroupKey(Tuple tuple);
BasicBlockStation
    public abstract int getCurrent(Tuple tuple);
    public abstract boolean nextChunk (Tuple tuple);
EpochStation
    public    abstract    void
processChunkByGroup(GroupMeasures grpMeasureList,
                    BasicOutputCollector
    collector);
```

The abstract functions can be inherited level by level, as required by the level of implementation, as illustrated in FIG. 2 that depicts an example for such hierarchy.

Hence, the open executor of the subject disclosure can further supply canonical mechanisms to parallelize stateful and granule dataflow process—via processing data flow based on chunks and groups. In this regard, for each vertex representing a logical operator in the dataflow graph; the operation parallelization (launching multiple instances) occurs with input data partition (grouping)—which can remain consistent with the data buffering at each operation instance.

Figure 3A:
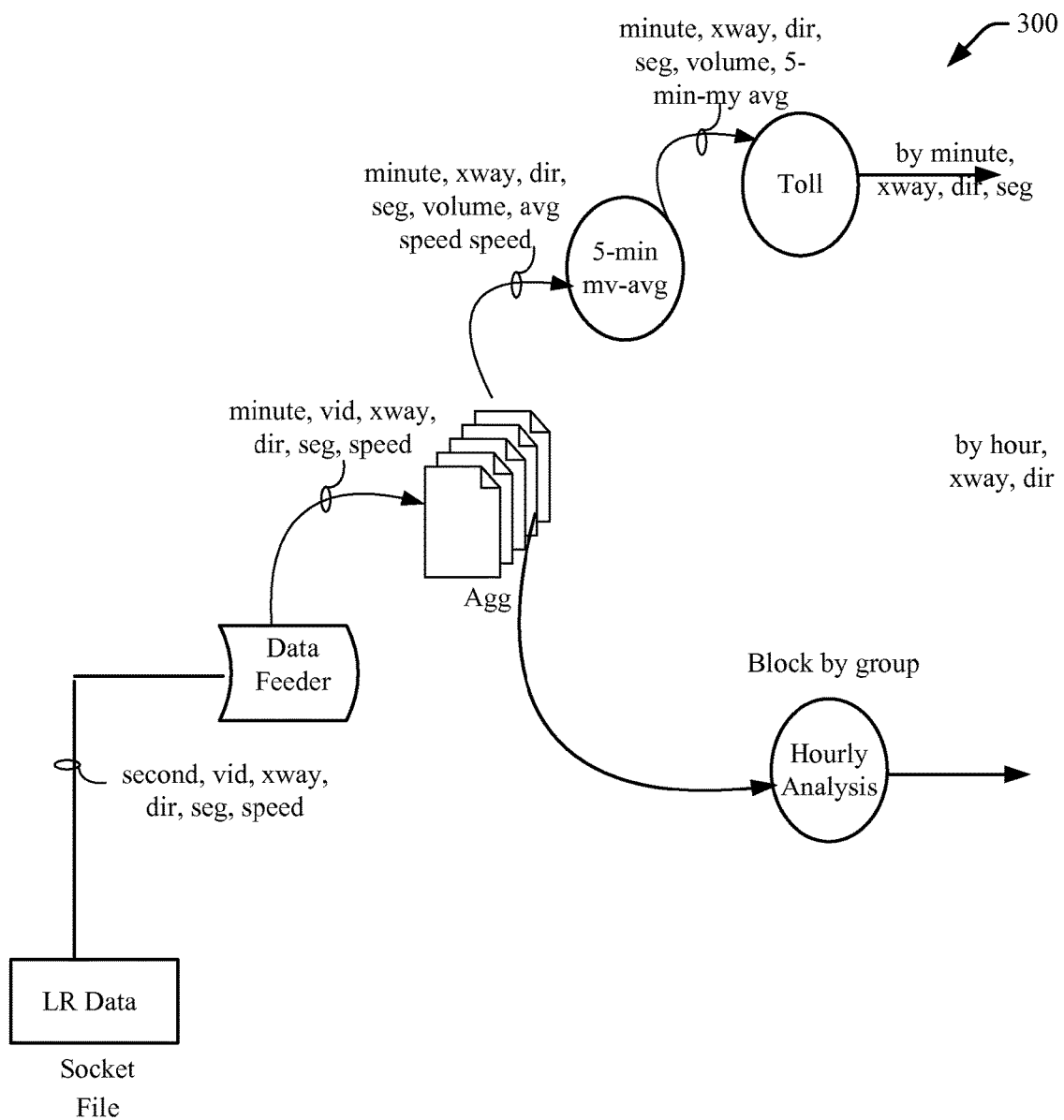
FIGS. 3A & 3B illustrate examples for an extended Linear-Road (LR) benchmark in context of various aspects of the subject disclosure.
Figure 3B:
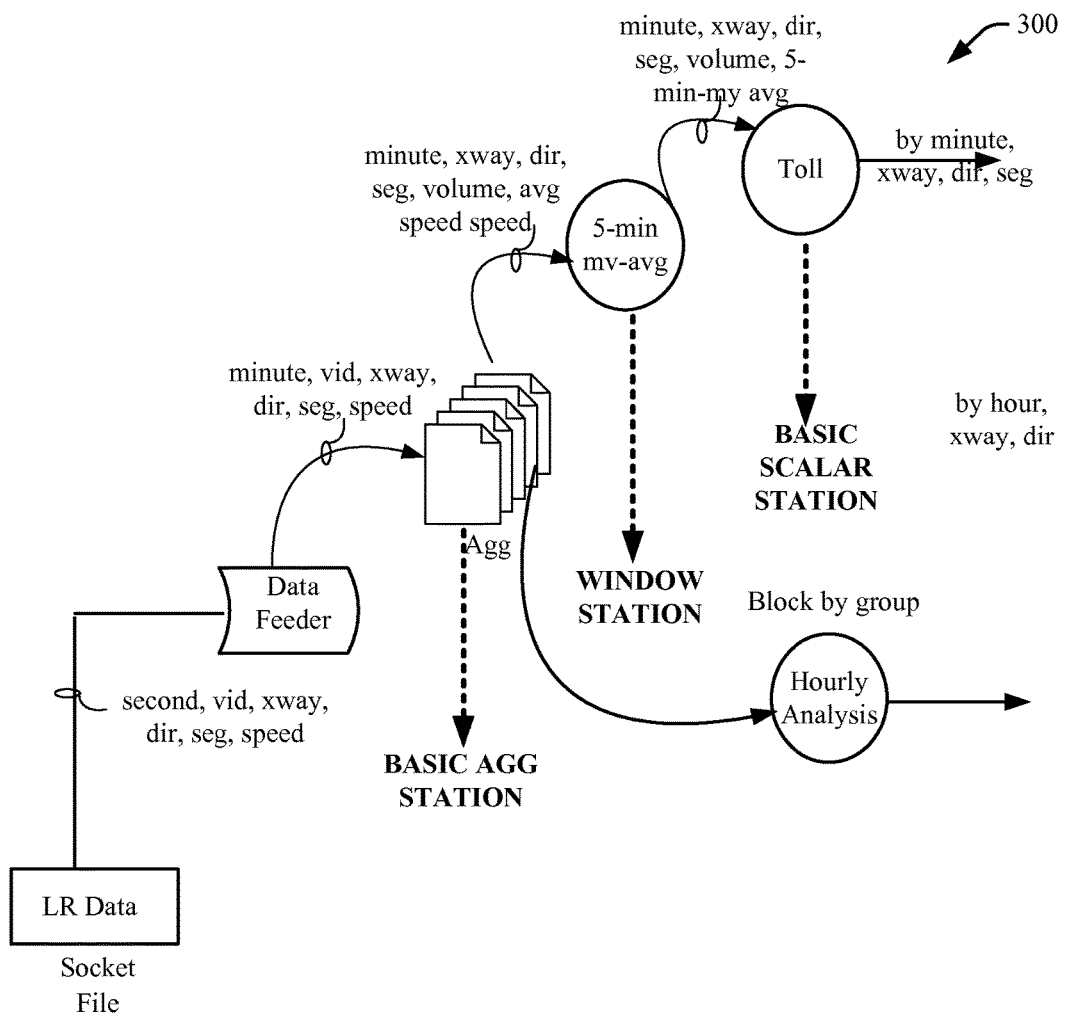

FIGS. 3A & 3B illustrate various implementations of the subject disclosure in context of an extended Linear-Road (LR) benchmark example. As illustrated, the Linear-Road benchmark depicts the traffic on 10 express ways, wherein each express way has two directions and 100 segments. To this end, vehicles may enter and exit any segment, and position of each car is read every 30 seconds—wherein each reading can constitutes an event, or stream element, for the system. Moreover, a car position report can include attributes of: vehicle_id, time (in seconds); speed (mph); xway (express way); dir (direction); seg (segment), and the like. In a simplified benchmark, the traffic statistics for each highway segment, such as the number of active cars, their average speed per minute, and the past 5-minute moving average of vehicle speed, can be computed—wherein based on such per-minute and per-segment statistics, the application computestolls to be charged to a vehicle entering a segment any time during a next minute. As an extension to the LR application, the traffic statuses analyzed and reported every hour. A logical stream process for this example is illustrated in FIG. 3A.

In this regard, an exemplary stream analytics process can be specified in Java code as follows;

```
public class LR_Process {
...
    public static void main(String[ ] args) throws Exception {
        ProcessBuilder builder = new ProcessBuilder( );
        builder.setFeederStation("feeder", new
LR_Feeder(args[0]), 1);
        builder.setStation("agg", new LR_AggStation(0, 1), 6)
.hashPartition("feeder",
            new Fields("xway", "dir", "seg"));
        builder.setStation("mv", new LR_MvWindowStation(5),
4).hashPartition("agg",
            new Fields("xway", "dir", "seg"));
        builder.setStation("toll", new LR_TollStation( ),
4).hashPartition("mv",
            new Fields("xway", "dir", "seg"));
        builder.setStation("hourly", new LR_BlockStation(0, 7),
2).hashPartition("agg",
            new Fields("xway", "dir"));
            Process process = builder.createProcess( );
            Config conf = new Config( ); conf.setXXX(...); ...
            Cluster cluster = new Cluster( );
            cluster.launchProcess("linear-road", conf, process);
            ...
    }
}
```

In the above topology specification, hints for parallelization can be supplied to the operators "agg" (6 instances), "my" (5 instances), "toll" (4 instances) and "hourly" (2 instances), so that the platform can perform adjustments accordingly, and based on resource availability.

As illustrated in FIG. 3B the operation "agg" aims to deliver the average speed in each express-way's segment per minute. Subsequently, an execution of this operation on an infinite stream can be performed in a sequence of epochs, one on each stream chunks.

To enable applying such operation to the stream data one chunk at a time, and to return a sequence of chunk-wise aggregation results, the input stream is divided into 1 minute (60 seconds) based chunks, $S_0, S_1, \ldots S_i$ (where i is an integer), such that execution semantics of "agg" is defined as a sequence of one-time aggregate operation on the data stream input, minute by minute.

For an operator, O over an infinite stream of relation tuples S with a criterion "θ" for cutting S into an unbounded sequence of chunks—(e.g. by every 1 minute time window, $<S_0, S_1, \ldots, S_i, \ldots >$ where $S_i$ denotes the i-th "chunk" of the stream according to the chunking criterion θ)—then semantics of applying 0 to the unbounded stream S is represented by:

$$Q(S) \rightarrow <Q(S_0), \ldots Q(S_i), \ldots >$$

which continuously generates an unbounded sequence of results, one on each chunk of the stream data.

Punctuating input stream into chunks and applying operation epoch by epoch to process the stream data chunk by chunk can be considered as a type of meta-property of a class of stream operations. Such operations can be supported automatically and systematically on the epoch station (or the ones subclassing it) and provide system support in the following aspects.

An epoch station can host a stateful operation that is data-parallelizable, and therefore the input stream is hash-partitioned, which remains consistent with the buffering of data chunks as described earlier. Moreover, several types of stream punctuation criteria can be specified, including punctuation by cardinality, by time-stamps and by system-time period, which are covered by the system function of:
    public boolean nextChunk(Tuple, tuple)
which determines that the current tuple belongs to the next chunk or not.

If the current tuple belongs to the new chunk, the present data chunk can be dumped from the chunk buffer for aggregation/group-by in terms of the user-implemented abstract method processChunkByGroup( ). Every input tuple (or derivation) can be buffered, either into the present or the new chunk. By specifying additional meta properties and by subclassing the epoch station, other aspects of system support can further be introduced.

For example, an aggregate of a chunk of stream data can be made once by end of the chunk, or tuple-wise incrementally. In the latter case an abstract method for per-tuple updating the partial aggregate can be provided and implemented by the user.

Figure 4:
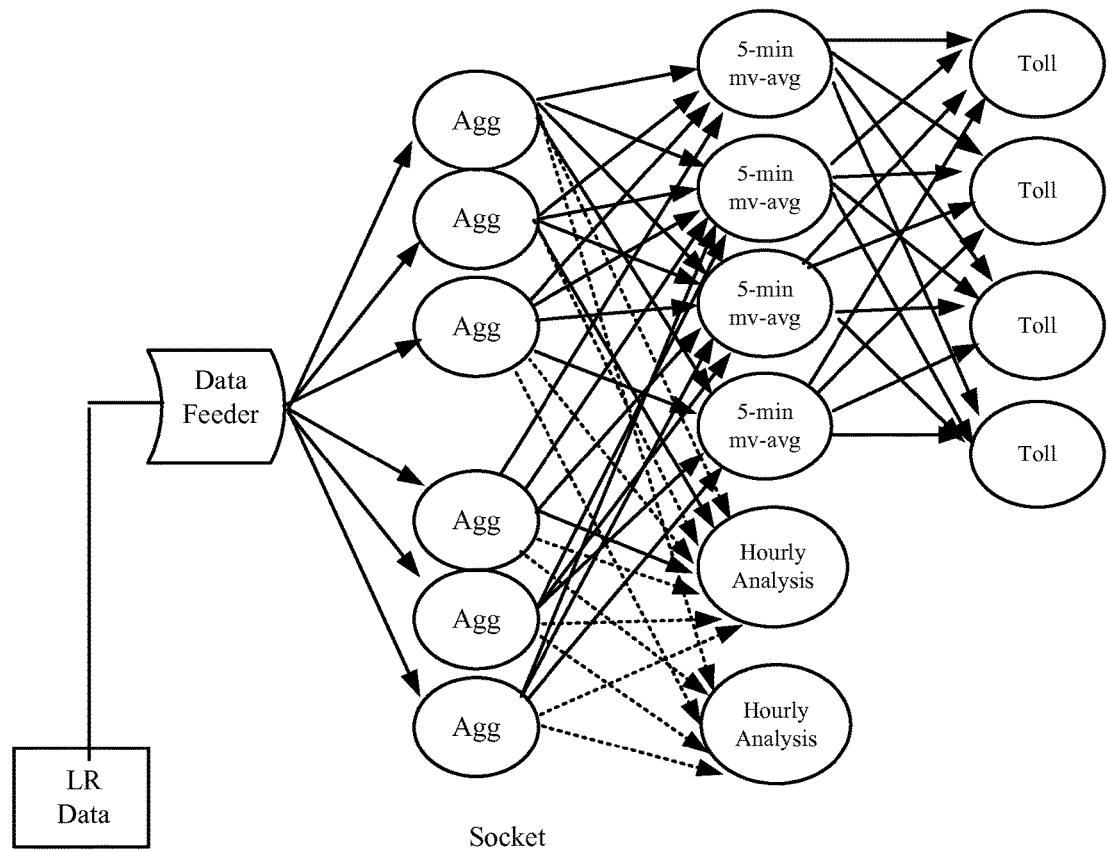
FIG. 4 illustrates an example for physical instances of operators in data-parallel execution, according to a further aspect of the subject disclosure.

It is noted that the paces of dataflow with regards to timestamps can be different at different operators. For instance, the "agg" operator (and its downstream operators) can be applied to the input data minute by minute. Yet, when the "hourly analysis" operator is applied to the input stream minute by minute, it generates output stream elements hour by hour. As such, combination of group-wise and chunk-wise stream analytics provide a generalized abstraction for parallelizing and granulizing the continuous and incremental dataflow analytics. An example for the physical instances of these operators for data-parallel execution as described above is illustrated in FIG. 4.

Figure 5:
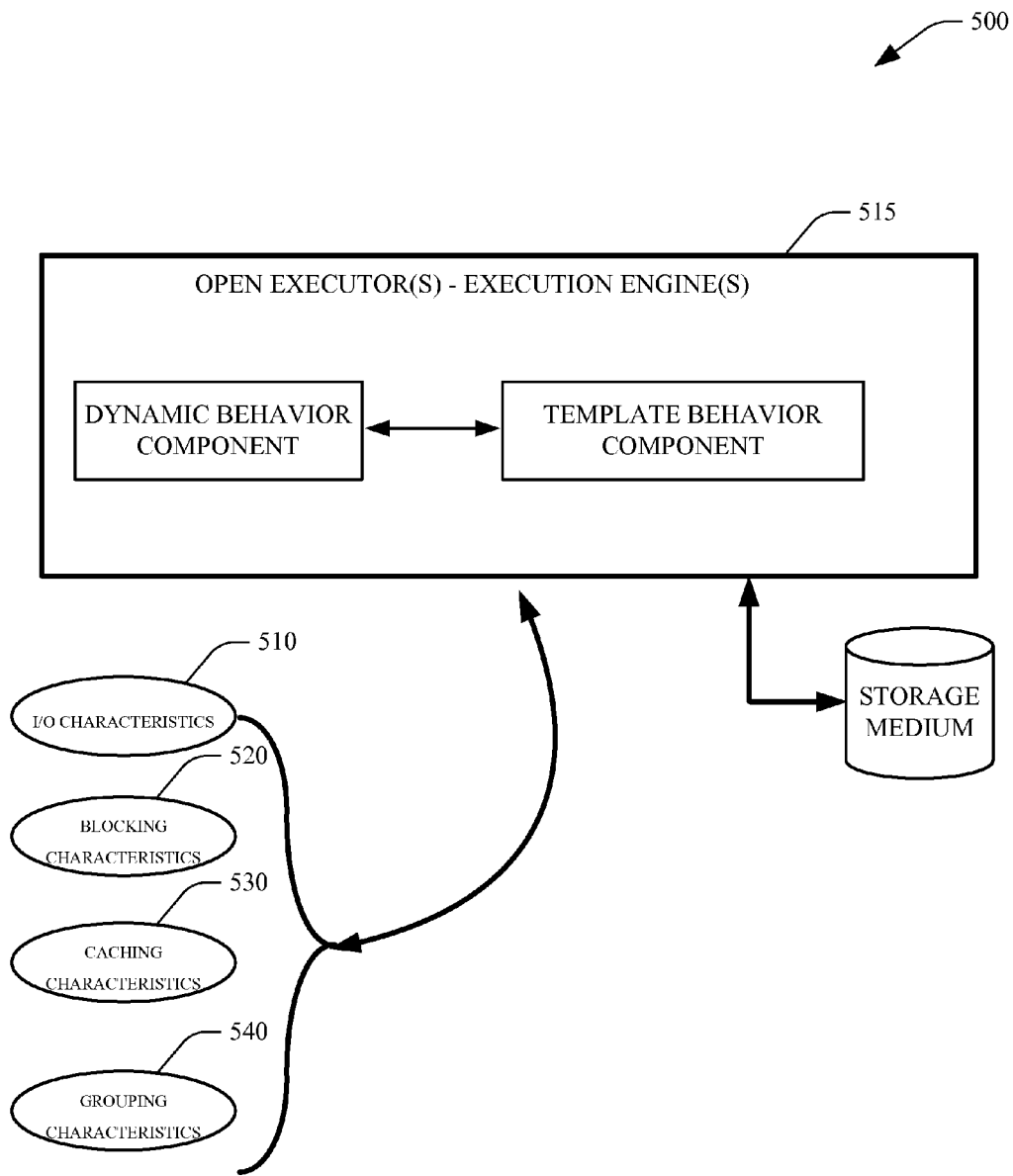
FIG. 5 illustrates an example of a data stream processing analytics platform, according to an implementation of the subject disclosure.

FIG. 5 illustrates an example of a data stream processing analytics platform 500 including an open station 515 that has certain characteristics in several dimensions, such as the provisioning of initial data, the granularity of event processing, memory context, invocation patterns, results grouping and shuffling, and the like.

As described in detail below, many stream operations have common characteristics and fall in the same execution pattern, wherein aspects of the subject disclosure can categorize and support them systematically—as opposed to hand-coding them one by one. Moreover, the execution pattern of a class of stream operators can depend on their meta-properties as well as the special execution support they may require. Such may be considered as the meta-data, or the design pattern of operators. Below is an example for a list of characteristics, which can include:

I/O Characteristics (510); that specifies the number of input tuples and output tuples, which the stream operator is designed to handle stream data chunk-wise. Examples can include 1:1 (one input/one output), 1:N (one input/multiple outputs), M:1 (multiple inputs/one output) and M:N (multiple inputs/multiple outputs, where M, N are integers). Accordingly, for each chunk of the input, one can classify the operators into Scalar (1:1); Table Valued (TV) (1:N); Aggregate (N:1). One can support the following chunking criteria for punctuating the input tuples, namely: (a) by cardinality, e.g. number of tuples; and (b) by granule as a function applied to an attribute value, such as get_minute (timestamp in second).

Blocking Characteristics (520): indicates that in the multiple input case, the operator applies to the input tuple one by one incrementally (e.g. per-chunk aggregation), or first pools the input tuples and then apply the function to all the pooled tuples. Accordingly the block mode can be per-tuple or blocking. Specifying the blocking characteristics describes for the system to invoke the operator in the designated way, and hence facilitate the user's effort to handle them in the application program.

Caching Characteristics (530): pertains to the 4 levels potential cache states, namely: 1) per-process state that covers the whole dataflow process with certain initial data objects; 2) Per-chunk state that covers the processing of a chunk of input tuples with certain initial data objects; 3) Per-input state that covers the processing of an input tuple possibly with certain initial data objects for multiple returns; 4) Per-return state that covers the processing of a returned tuple.

Grouping Characteristics (540): indicates a topology of how to send tuples between two operators, wherein different kinds of stream groupings exists. The simplest kind of grouping can be referred to as a "random grouping", which can send the tuple to a random task. Such can have the effect of evenly distributing the work of processing the tuples across all of the consecutive downstream tasks. The hash grouping can ensure the tuples with the same value of a given field be directed to the same task. As such, hash groupings can be implemented by employing consistent hashing, for example.

As explained earlier, ensuring the characteristics of stream operators by user programs can often be tedious and not system guaranteed. Alternatively and as provided by the subject disclosure, categorizing the common classes of operation characteristics and supporting them automatically and systematically can simplify users' efforts and enhance the quality of streaming application development. In this regard, the open-stations of the subject disclosure can contain stream operators and encapsulate their characteristic, and towards the open-executor class hierarchy of FIG. 2.

Figure 6:
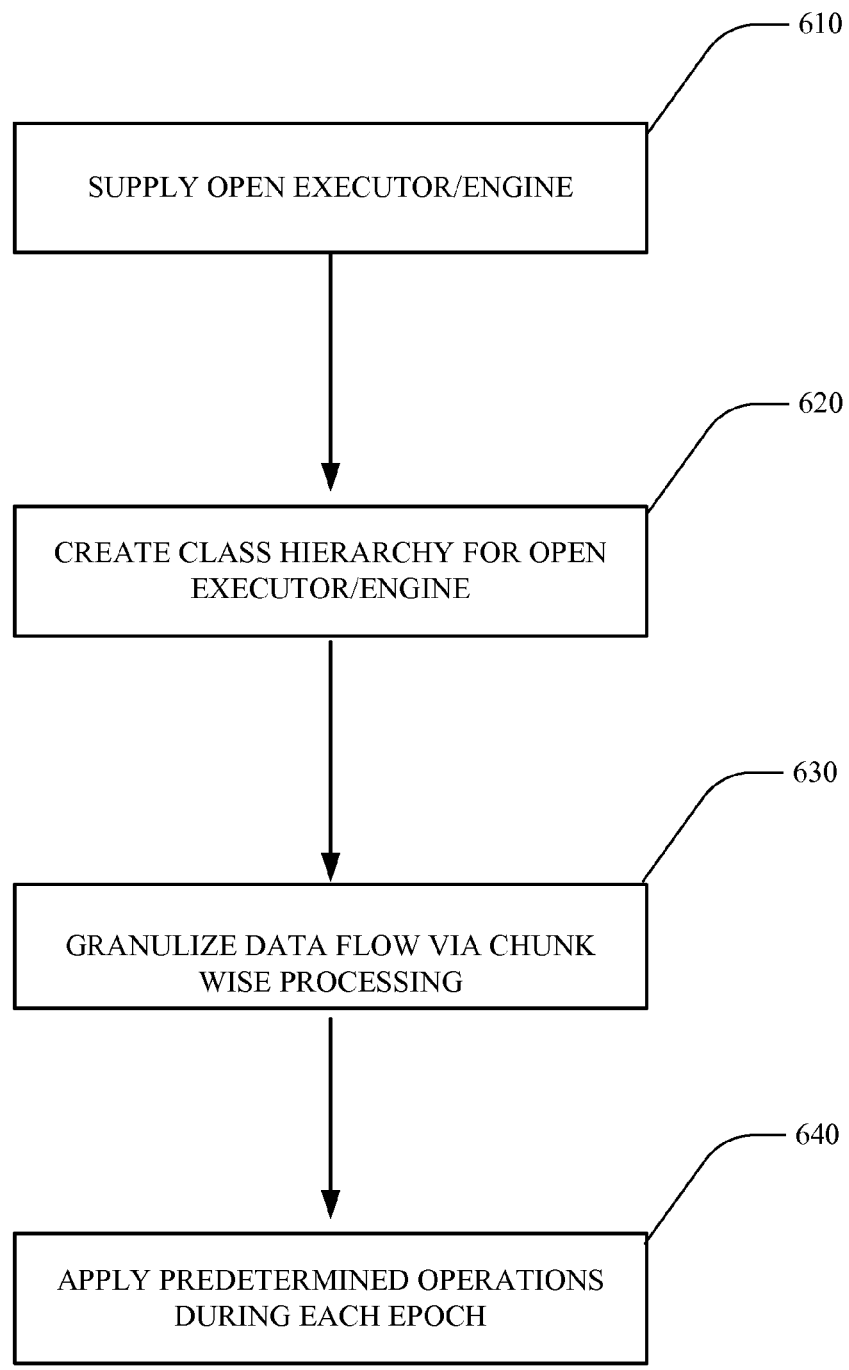
FIG. 6 illustrates a related methodology of employing an open-executor, in accordance with a further implementation of the subject disclosure.

FIG. 6 illustrates a related methodology 600 of employing an open-executor according to a further aspect of the subject disclosure. While this exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

At 610 an open executor/execution engine can be supplied that enables users to invoke abstract processes according to application logic. The open-executor remains open to plugging-in application logic, wherein abstract methods can be invoked or implemented by users according to the application logic. For example, such can include specifying a station with in-flow grouping attributes and the granule criterion for group-wise and chunk-wise computation. As explained earlier, specified in a station class, there can exist both the system defined methods and the user defined methods. The system defined methods can include the open-executor that is open to plugging-in application logic, wherein abstract methods can be invoked or implemented by users according to the application logic. Similarly, the open-executor class or the station class can include abstract methods that can be implemented by the user based on the application logic. A station class hierarchy can be created at 620 with each class facilitated with a respective open-executor as well as related system utilities. Next and at 630 data flow can be granulized via chunk wise processing. As such performing granule semantics and managing dataflow can occur in a "chunk-wise" manner, by punctuating and buffering data consistently. Subsequently and at 640, tuples associated with a chunk can be processed, wherein predetermined operations (e.g., aggregations) can be applied to the data chunk-wise by the end of each epoch, and other operations may be deemed tuple-wise.

Figure 7:
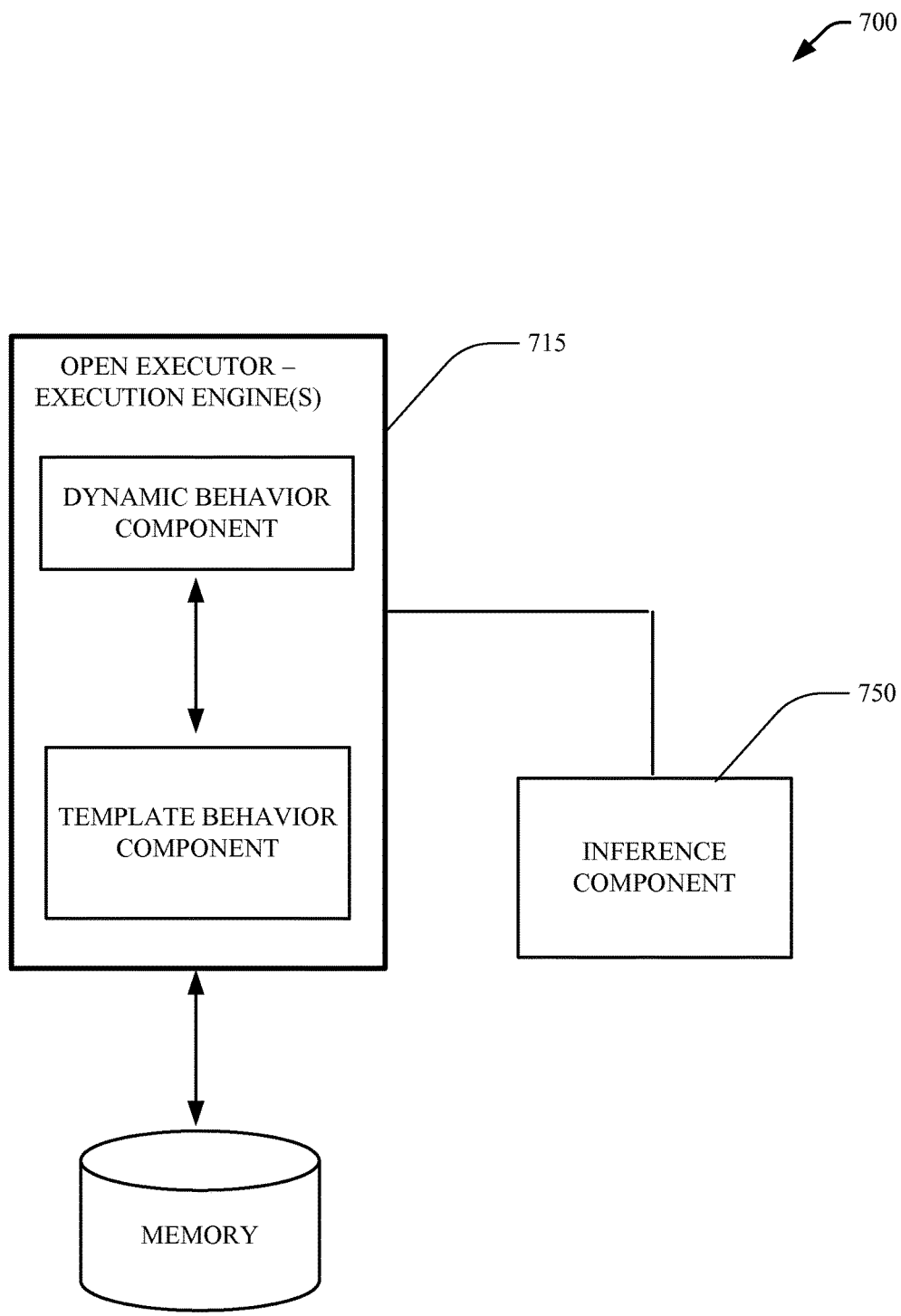
FIG. 7 illustrates an inference component that can interact with the open-executor, according to another implementation of the subject disclosure.

FIG. 7 illustrates an inference component (e.g., an artificial intelligence) 750 that can interact with the open-executor 715, to facilitate inferring and/or determining when, where, how to develop streaming operations in different characteristic categories, and provide for canonical mechanisms to parallelize stateful and granule dataflow analytics, according to an aspect of the subject disclosure.

As used herein, the term "inference" refers generally to the process of reasoning about or inferring states of the system, environment, and/or user from a set of observations as captured via events and/or data. Inference can identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The inference component 750 can employ any of a variety of suitable AI-based schemes as described supra in connection with facilitating various aspects of the herein described subject matter. For example, a process for learning explicitly or implicitly how parameters are to be created for training models based on similarity evaluations can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

The subject application can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, SVM's can be configured via a learning or training phase within a classifier constructor and feature selection module. A classifier is a function that maps an input attribute vector, x=(x1, x2, x3, x4, xn), to a confidence that the input belongs to a class—that is, f(x)=confidence(class).

Exemplary Networked and Distributed Environments

Figure 8:
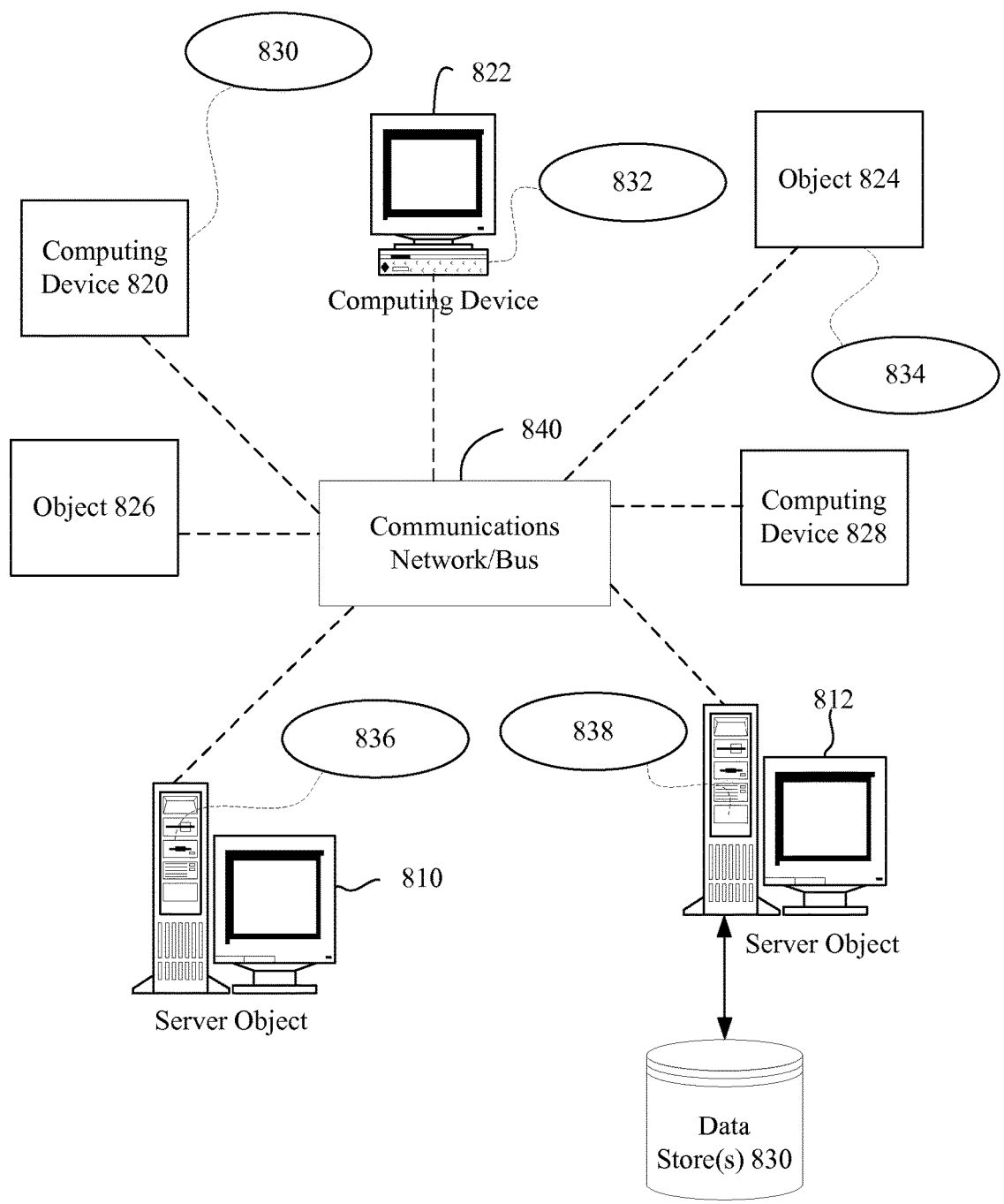
FIG. 8 provides a schematic diagram of an exemplary networked or distributed computing environment, wherein examples described herein can be implemented.

FIG. 8 provides a schematic diagram of an exemplary networked or distributed computing environment 800 in which examples described herein can be implemented. The distributed computing environment includes computing objects 810, 812, etc. and computing objects or devices 820, 822, 824, 826, 828, etc., which can include programs, methods, data stores, programmable logic, etc., as represented by applications 830, 832, 834, 836, 838. It is to be appreciated that computing objects 810, 812, etc. and computing objects or devices 820, 822, 824, 826, 828, etc. can include different devices, such as personal digital assistants (PDAs), audio/video devices, mobile phones, MPEG-1 Audio Layer 3 (MP3) players, personal computers, laptops, tablets, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, communications network 840 can include other computing objects and computing devices that provide services to the system of FIG. 8, and/or can represent multiple interconnected networks, which are not shown. Each computing object 810, 812, etc. or computing objects or devices 820, 822, 824, 826, 828, etc. can also contain an application, such as applications 830, 832, 834, 836, 838, that might make use of an application programming interface (API), or other object, software, firmware and/or hardware, suitable for communication with or implementation of the various examples of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various examples.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "engine", "system," "executor" and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices can process data, or request transaction services or tasks that can implicate the techniques for systems as described herein for one or more examples.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 840 can be the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Computing objects 810, 812, etc. can also serve as client computing objects or devices 820, 822, 824, 826, 828, etc., as can be characteristic of a distributed computing environment.

As mentioned, the techniques described herein can be applied to any suitable device. It is to be understood, therefore, that handheld, portable and other computing devices and computing objects of all kinds are contemplated for use in connection with the various examples. In addition to the various examples described herein, it is to be understood that other similar examples can be used or modifications and additions can be made to the described example(s) for performing the same or equivalent function of the corresponding example(s) without deviating there from. Still further, multiple processing chips or multiple devices can share the performance of one or more functions described herein, and similarly, storage can be affected across a plurality of devices. The subject disclosure is not to be limited to any single example, but rather can be construed in breadth, spirit and scope in accordance with the appended claims.

What is claimed is:

1. An analytics system for data processing, comprising:
   machine nodes including processors;
   a first operator to receive a flow of data, the first operator executable as multiple instances running in parallel on the machine nodes; and
   an open-executor that is a container for the first operator, the open-executor comprising:

a dynamic-behavior component that is customizable for application logic associated with the flow of data, the dynamic-behavior component to accept dynamic plug-in of the application logic, and a template-behavior component that is predefined based on meta-properties of the first operator, the meta-properties representing an execution pattern of the first operator that is shared with a second operator.

2. The analytics system of claim 1, wherein the operator is to receive data as data partitions.

3. The analytics system of claim 2, wherein the data partitions are hash partitions.

4. The analytics system of claim 1, wherein a state for each of the instances of the operator is maintained as Key/Value store.

5. The analytics system of claim 1 further comprising an inference component to interact with the open-executor to facilitate customizations for the application logic.

6. The analytics system of claim 1, wherein the dynamic-behavior component is to accept dynamic plug-ins that change as the application logic changes.

7. The analytics system of claim 1, wherein the first operator corresponds to a first class within a hierarchy of classes, and wherein the open-executor is for the first class, the analytics system further comprising a second open-executor that is a container for a third operator corresponding to a second of the classes of the hierarchy, the second open-executor comprising:

a dynamic-behavior component to accept another dynamic plug-in based on the application logic, and a template-behavior component that is predefined based on meta-properties of the third operator.

8. The analytics system of claim 7, wherein the meta-properties of the third operator are different from the meta-properties of the first operator corresponding to the first class.

9. The analytics system of claim 1, wherein the execution pattern of the first operator that is shared with the second operator comprises a shared characteristic shared by the first and second operators and is selected from among: a shared I/O characteristic relating to handling input and output tuples, a shared blocking characteristic relating to blocking of input tuples, and a grouping characteristic relating to how tuples are sent between operators.

10. The analytics system of claim 1, wherein the open-executor is a first open-executor, the analytics system further comprising:

a second open-executor that is a container for the second operator, the second open-executor comprising:

a dynamic-behavior component that is customizable for the application logic, the dynamic-behavior component of the second open-executor to accept dynamic plug-in of the application logic, and a template-behavior component that is predefined based on the meta-properties representing the execution pattern shared by the first and second operators.

11. A method of standardizing operations for processing a data stream, comprising:

providing an open-executor that is a container of a first operator of the data stream;

customizing the open-executor to an application logic associated with the data stream, the customizing comprising dynamically accepting, by the open-executor, plug-in of the application logic;

parallelizing execution of multiple instances of the first operator on machine nodes including processors; and performing an execution pattern of the first operator by a template-behavior component in the open-executor, the template-behavior component predefined based on meta-properties of the first operator, the meta-properties representing the execution pattern that is shared with a second operator.

12. The method of claim 11 further comprising specifying in-flow grouping attributes for the open-executor to partition data in the data stream.

13. The method of claim 11 further comprising receiving a user plug-in by the open-executor, the user plug-in customizable to a change in the application logic.

14. The method of claim 13, wherein the first operator corresponds to a first class within a hierarchy of classes, and wherein the open-executor is for the first class, the method further comprising:

customizing a second open-executor for a second of the classes of the hierarchy, the second open-executor being a container for a third operator corresponding to the second class, wherein customizing the second open-executor comprises dynamically accepting, by the second open-executor, a further user plug-in based on the application logic.

15. The method of claim 11 further comprising granulizing the data stream by chunk wise processing.

16. The method of claim 15 further comprising applying a predetermined operation at an end of an epoch.

17. The method of claim 15 further comprising inferring the customizing using artificial intelligence.

18. The method of claim 11, wherein the open-executor is a first open-executor, the method further comprising:

providing a second open-executor that is a container for the second operator, the second open-executor comprising:

a dynamic-behavior component that is customizable for the application logic, the dynamic-behavior component of the second open-executor to accept dynamic plug-in of the application logic, and a template-behavior component that is predefined based on the meta-properties representing the execution pattern shared by the first and second operators.

19. The method of claim 11, wherein the execution pattern of the first operator that is shared with the second operator comprises a shared characteristic selected from among: a shared I/O characteristic relating to handling input and output tuples, a shared blocking characteristic relating to blocking of input tuples, and a grouping characteristic relating to how tuples are sent between operators.

20. A computer system comprising:

a storage medium that stores computer-executable instructions, at least one processor communicatively coupled with the storage medium, the computer-executable instructions executable on the at least one processor to:

dynamically customize an open-executor to an application logic associated with a data stream, wherein the open-executor is a container of a first operator for processing the data stream, and wherein the dynamically customizing of the open-executor comprises dynamically plugging in the application logic to the open-executor, parallelize execution of multiple instances of the operator to process the data stream, and perform an execution pattern of the first operator by a template-behavior component in the open-executor, the template-behavior component predefined based on meta-properties of the first operator, the meta-properties representing the execution pattern of the first operator that is shared with a second operator.

21. The computer system of claim 20, further comprising a user plug-in that is customizable to a change in the application logic, the open-executor to dynamically receive the user plug-in.

22. The computer system of claim 21, wherein the operator corresponds to a first class within a hierarchy of classes, and wherein the open-executor is for the first class, the computer system further comprising:
 a second open-executor for a second of the classes of the hierarchy, the second open-executor being a container for a third operator corresponding to the second class; and
 a second user plug-in based on the application logic, wherein the computer-executable instructions are executable to further customize the second open-executor by dynamically plugging in the second user plug-in to the second open-executor.

* * * * *